ized and shaped as attachable support members to the board or can be a continuous extension of the board's cutting-chopping area, sized and shaped so as to provide the compression-resistance to the impact force exerted, on the board, by the action of the cleaver or mallet.

(12) United States Patent
Frey

(10) Patent No.: US 9,149,159 B1
(45) Date of Patent: Oct. 6, 2015

(54) FLEX-I-BOARD

(71) Applicant: Nicholas Gregory Frey, New York, NY (US)

(72) Inventor: Nicholas Gregory Frey, New York, NY (US)

(73) Assignee: Nicholas Gregory Frey, New York, NY (US)

( * ) Notice: Subject to any disclaimer, the term of this patent is extended or adjusted under 35 U.S.C. 154(b) by 0 days.

(21) Appl. No.: 14/121,985

(22) Filed: Nov. 10, 2014

(51) Int. Cl.
*A47J 47/00* (2006.01)
*B26D 1/28* (2006.01)
*B26D 9/00* (2006.01)
*B26D 11/00* (2006.01)

(52) U.S. Cl.
CPC ............ *A47J 47/005* (2013.01); *B26D 1/28* (2013.01); *B26D 9/00* (2013.01); *B26D 11/00* (2013.01)

(58) Field of Classification Search
CPC ............ B26D 9/00; B26D 11/00; B26D 1/28; A47J 47/005
USPC ........................ 269/310, 16; 312/140.4; 83/39
See application file for complete search history.

(56) References Cited

U.S. PATENT DOCUMENTS

| | | | | |
|---|---|---|---|---|
| 1,809,603 A | * | 6/1931 | Reed | 248/628 |
| 4,547,913 A | * | 10/1985 | Phillips | 623/27 |
| 5,037,444 A | * | 8/1991 | Phillips | 623/55 |
| 5,116,279 A | * | 5/1992 | Perry | 452/195 |
| 5,649,812 A | * | 7/1997 | Schoenmeyr et al. | 417/363 |
| 5,984,294 A | * | 11/1999 | Bogomolny | 269/289 R |
| 6,910,685 B2 | * | 6/2005 | Sellers | 269/289 R |
| 8,882,089 B2 | * | 11/2014 | Weisbeck | 267/140.11 |
| 2004/0056403 A1 | * | 3/2004 | Porchia et al. | 269/289 R |
| 2004/0170810 A1 | * | 9/2004 | Rasmussen | 428/174 |
| 2006/0194456 A1 | * | 8/2006 | Cawley et al. | 439/74 |
| 2007/0245573 A1 | * | 10/2007 | Willen et al. | 30/302 |
| 2009/0200723 A1 | * | 8/2009 | Lim et al. | 269/289 R |
| 2011/0005165 A1 | * | 1/2011 | Stadthagen-Gonzalez | 52/783.1 |

\* cited by examiner

*Primary Examiner* — Lee D Wilson
*Assistant Examiner* — Mahdi H Nejad

(57) ABSTRACT

A significantly improved plastic or wood cutting-chopping board which has four legs, each dimensioned and shaped such that when board surface is impacted by a cleaver or mallet, each of the legs can depress through three stages of compression-resistance independently and each to a degree determined by the point of impact of the cleaver on the board relative to the legs. The impact of the cleaver or mallet is dissipated in the compression of the legs resulting in significantly less vibration being transmitted to the countertop or tabletop and consequently significantly less noise, in relation to the conventional, stationary cutting-chopping board. The board, upon impact, will depress to the level where the upward force of the compressed legs on the board equals the downward impact force of the cleaver or mallet on the board. The legs or compressible support members can be variously sized and shaped as attachable support members to the board or can be a continuous extension of the board's cutting-chopping area, sized and shaped so as to provide the compression-resistance to the impact force exerted, on the board, by the action of the cleaver or mallet.

4 Claims, 10 Drawing Sheets

FLEX-I-BOARD

CROSS-REFERENCE TO RELATED APPLICATIONS

This application claims the benefit of provisional patent application Ser. No. 61/962,450 filed 2013 Nov. 8 by the present inventor.

FEDERALLY SPONSORED RESEARCH

Not Applicable

SEQUENCE LISTING OR PROGRAM

Not Applicable

BACKGROUND

1. Field of Invention

This invention relates to a kitchenware item, specifically to countertop cutting-chopping boards used for supporting food while the food is being cut, chopped or malleted.

2. Prior Art

Oftentimes, cooking starts with cutting, chopping or malleting food. Typically, a type of cutting-chopping board is used to support the food during the cutting, chopping or malleting process.

Originally, boards were designed based on the following three factors: minimum damage to the knife or cleaver blade edge; ease of cleaning board surface; and for commercially used "boards", ability to hold heavy slabs of meat.

For plastic boards, damage to the knife or cleaver blade edge was minimized by using relatively soft plastics such as polyethylene or polypropylene.

For wood boards, damage to the knife or cleaver blade was minimized by using relatively soft woods, cut and glued lengthwise or sidewise. Boards made from the harder woods such as maple, were end grain constructed, which reduced damage to the blade edges because the action of the knife blade or the impact of the cleaver spread the wood fibers instead of cutting across the fibers as was the case, on the boards, constructed with lengthwise or sidewise cut wood.

Ease of cleaning a countertop board surface was achieved by the light weight of the plastic and most of the wooden boards, making them portable and therefore easy to rinse, after use, in the kitchen sink. Recently, thick, very dense and therefore very heavy rubber pads, ideal for extending the lives of frequently used cutting and chopping tools have surfaced in restaurant kitchens and are sometimes placed and used on the traditional, commercial, four legged heavy maple butcher blocks. This eliminates the need to constantly shave the end grain surface of the butcher block because of scouring and for cleaning.

Also recently, some of the countertop plastic boards have silicone dipped corners or thin lines of rubber on the underside, of the board, to reduce slipping, during use.

However, what has always been a problem when chopping on a plastic or wooden (or rubber) board on a countertop with a cleaver or a meat softening mallet, is the significant amount of vibrations (and consequent noise) transmitted from the impact of the chopping cleaver or meat mallet on the cutting-chopping board, to the countertop and to items located on the countertop, near the board, Even the expensive 2-3 inch wooden boards, when hit with a chopping or pounding tool shake-up the countertop and are very noisy.

A common practice is to try different spots on the countertop and use the board at the least noisiest spot. I've found that placing the board on one of the front corners of the kitchen sink when chopping to be the least noisy. However, positioning the board and stability while chopping, can be challenging.

SUMMARY

In accordance with one embodiment, a plastic or wood countertop cutting-chopping board with four compressible plastic legs attached to the underside of the board, absorbs a significant amount of the impact force, of the cleaver or meat mallet when chopping or pounding food, on the surface, of the board.

Because a significant amount, of the impact, of the cleaver or mallet is absorbed in compressing the legs, an insignificant amount of the impact force of the cleaver or mallet, on the board, reaches the countertop. This results in insignificant countertop vibration and consequently an insignificant amount of noise, when compared to the traditional cutting-chopping board.

In addition, there is less wear to the cleaver blade edge because upon impact, the cutting-chopping board moves down under the impact force, and the blade edge comes to a more gradual stop as opposed to traditional stationary board where the cleaver blade hits the stationary cutting-chopping board surface more abruptly.

DRAWINGS

Figures

In the drawings, sequential figures have the same number but different alphabetic suffixes.

FIGS. 6A to 6D on Diagram 6, show the functioning of the legs, of the preferred embodiment, in terms of the three levels of compression-resistance developed, in response to higher cleaver or mallet impact forces.

Figure 7A:
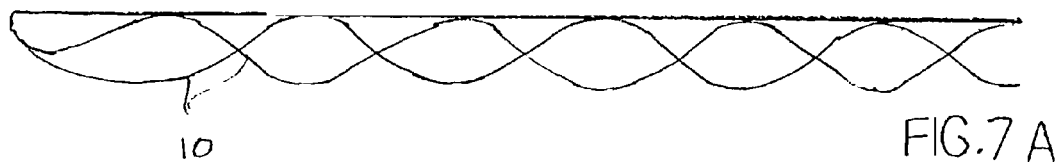
Figure 7B:
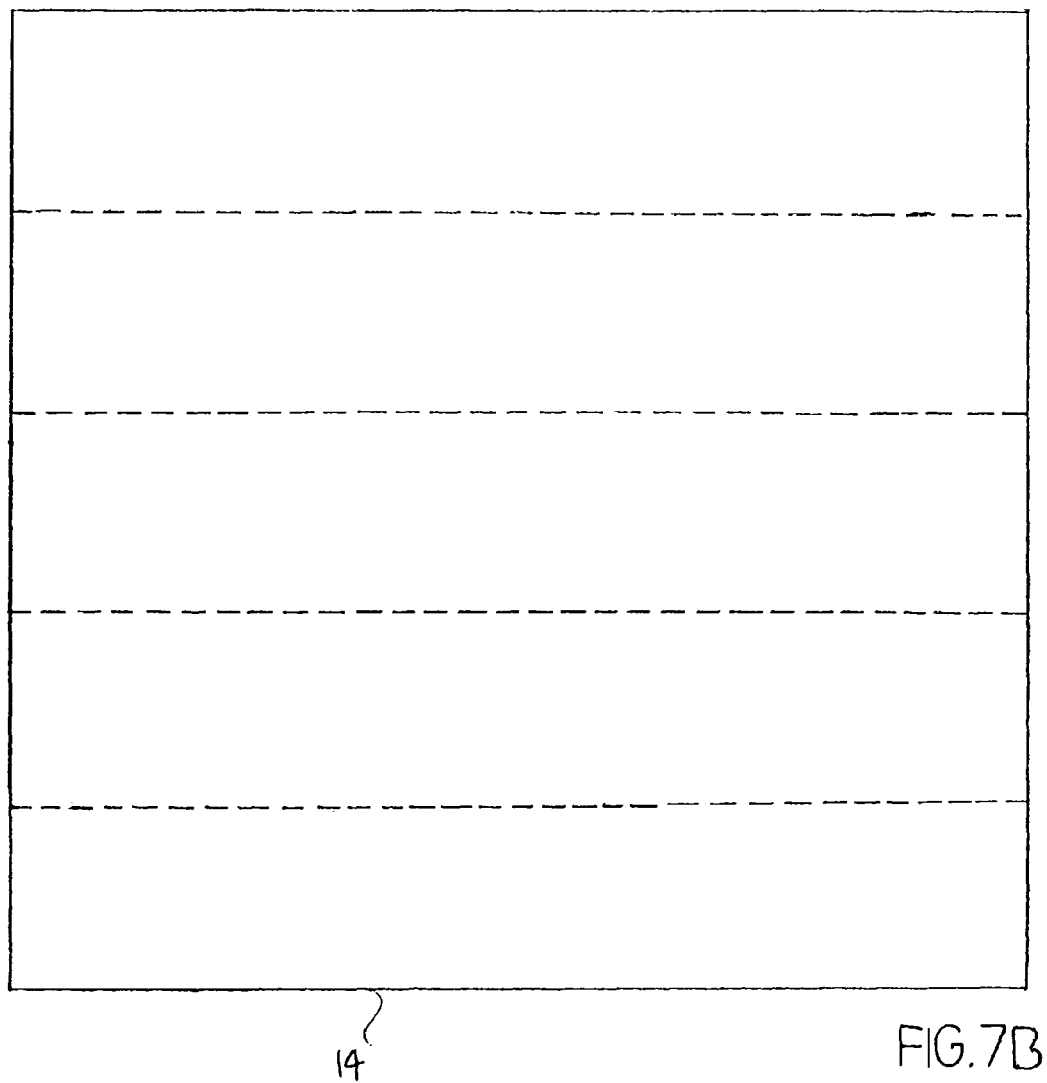

FIGS. 7A and 7B show the side view and top view respectively, of additional embodiment 1

Figure 8A:
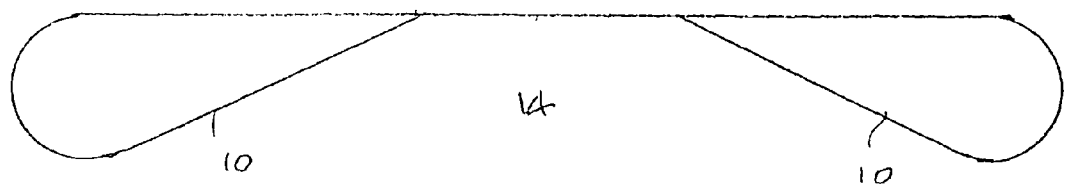
Figure 8B:
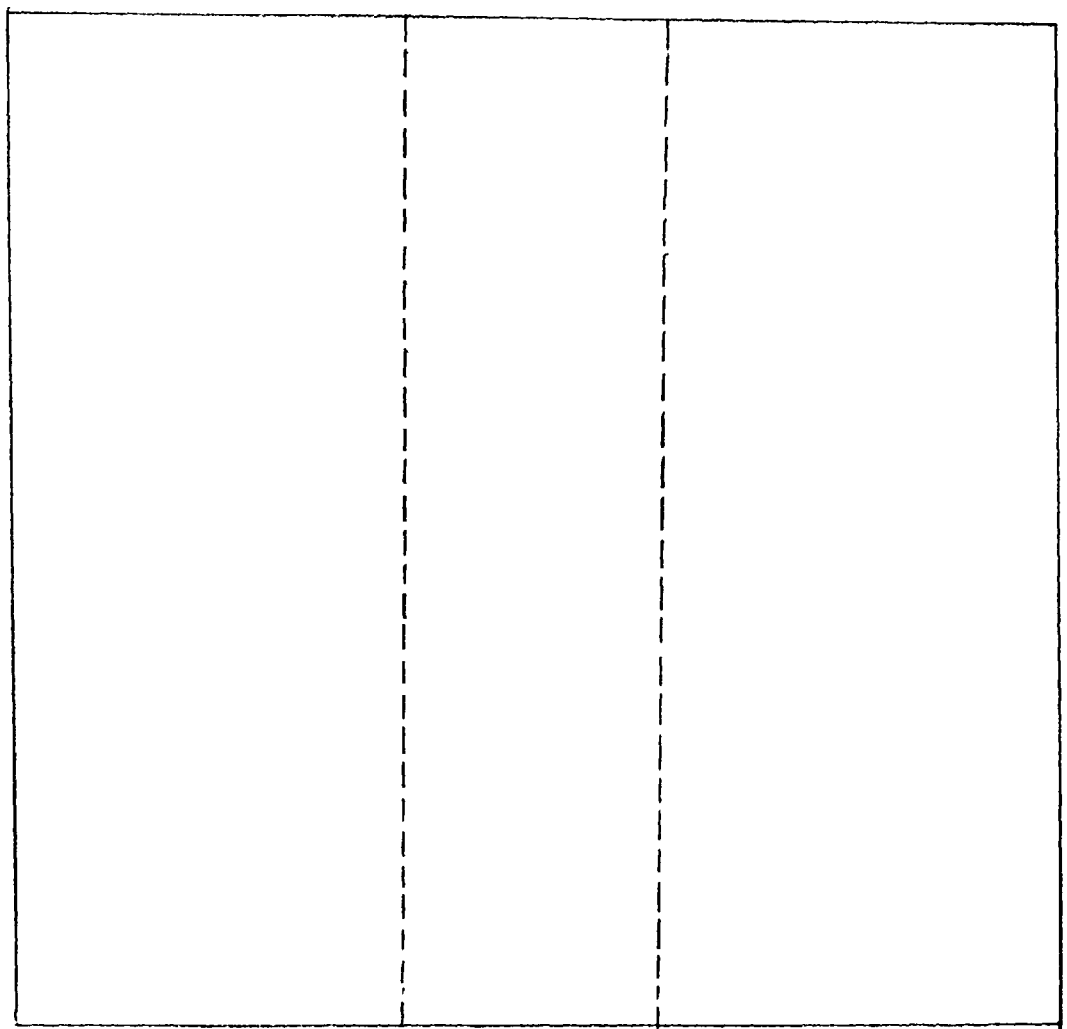

FIGS. 8A and 8B show the side view and top view respectively, of additional embodiment 2

Figure 9A:
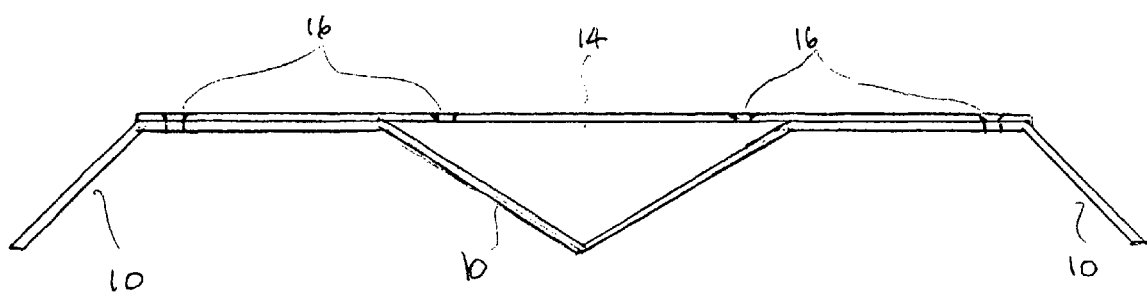
Figure 9B:
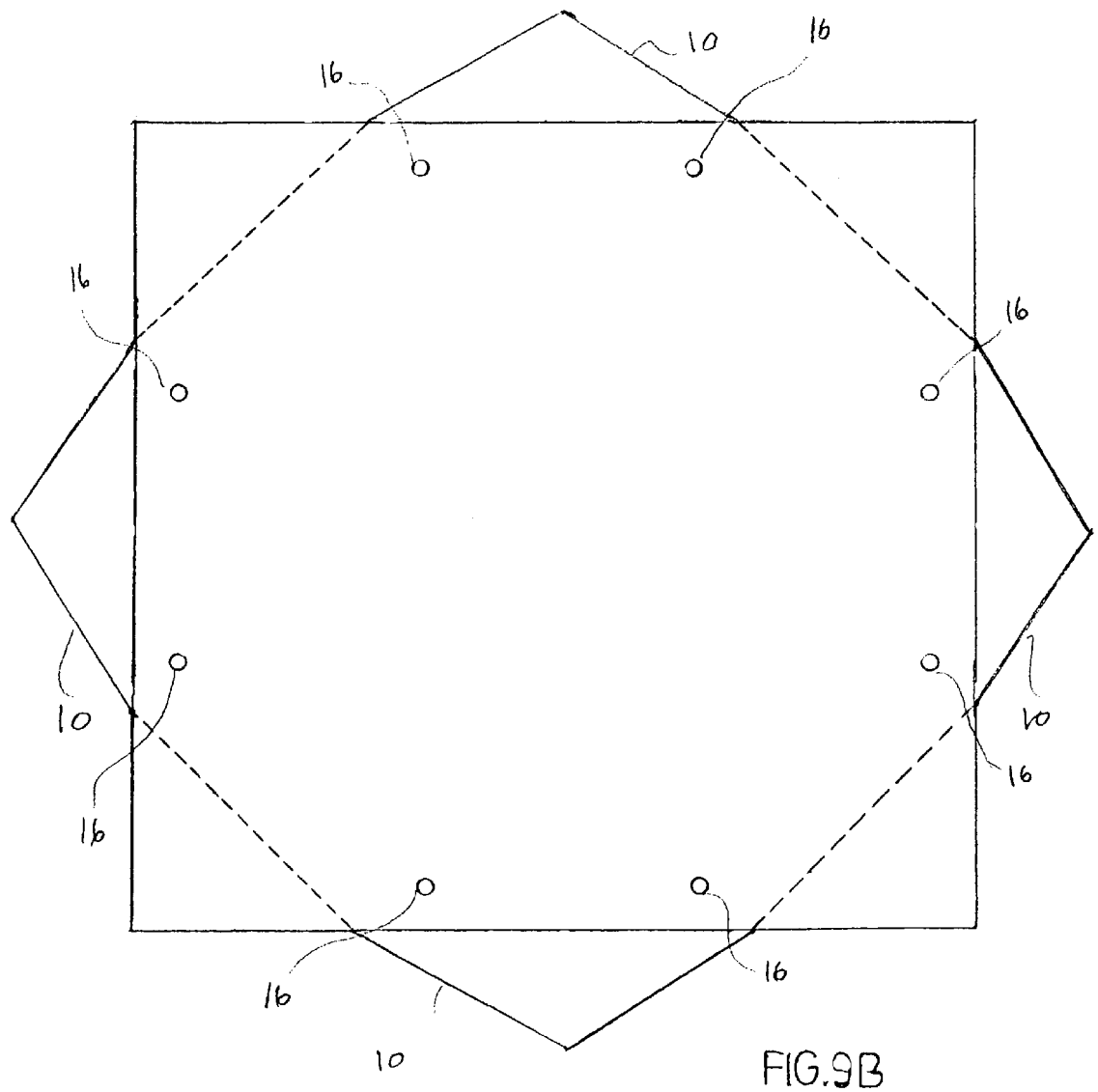

FIGS. 9A and 9B show the side view and top view respectively, of additional embodiment 3

| DRAWINGS—Reference Numerals | |
|---|---|
| 10 legs | 12 resistance extender |
| 14 cutting-chopping board | 16 machine screw hole |

DETAILED DESCRIPTION

FIGS. 1, 2, 3 4 and 5—Preferred Embodiment

Figure 1:
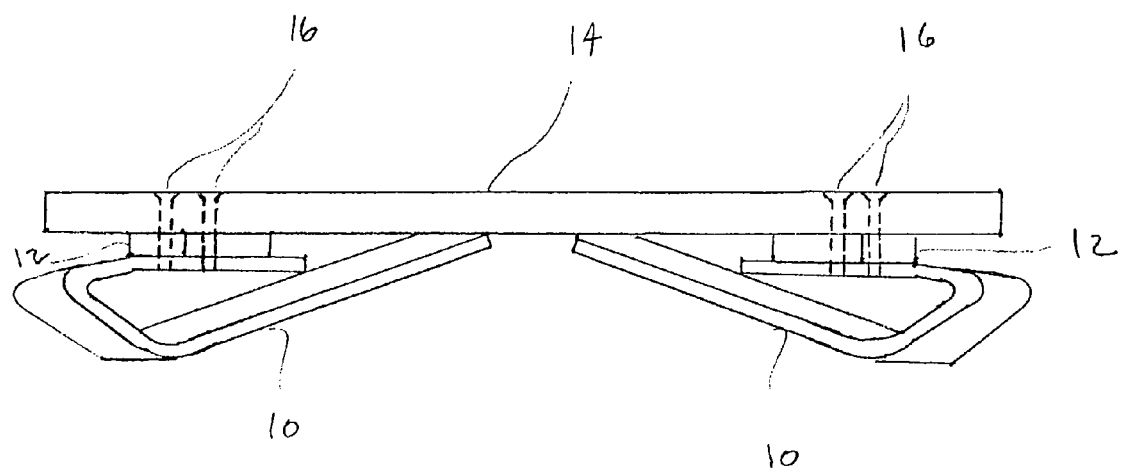
FIG. 1 shows a side view of the preferred embodiment.
Figure 2:
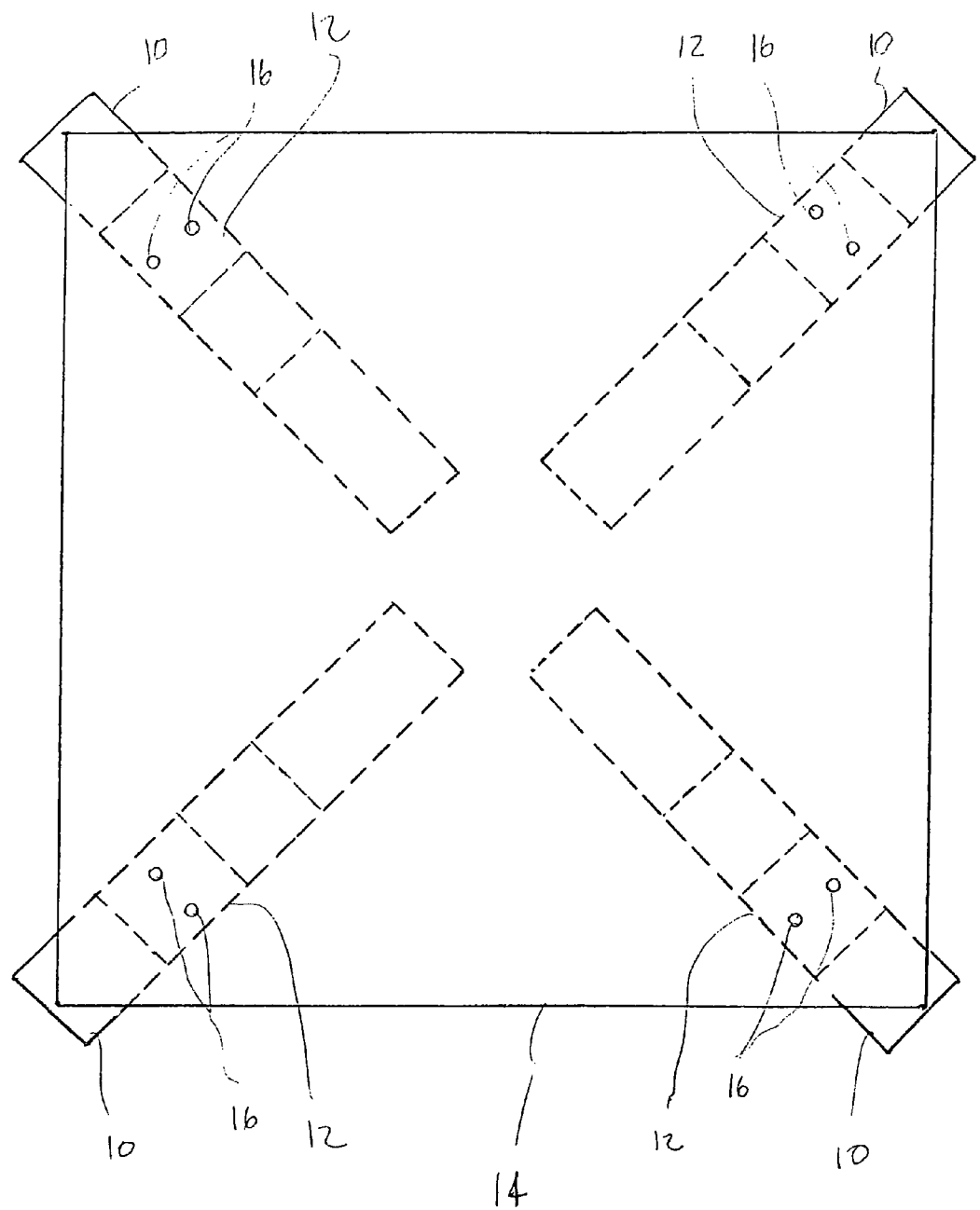
FIG. 2 shows the top view of the preferred embodiment.
Figure 3:
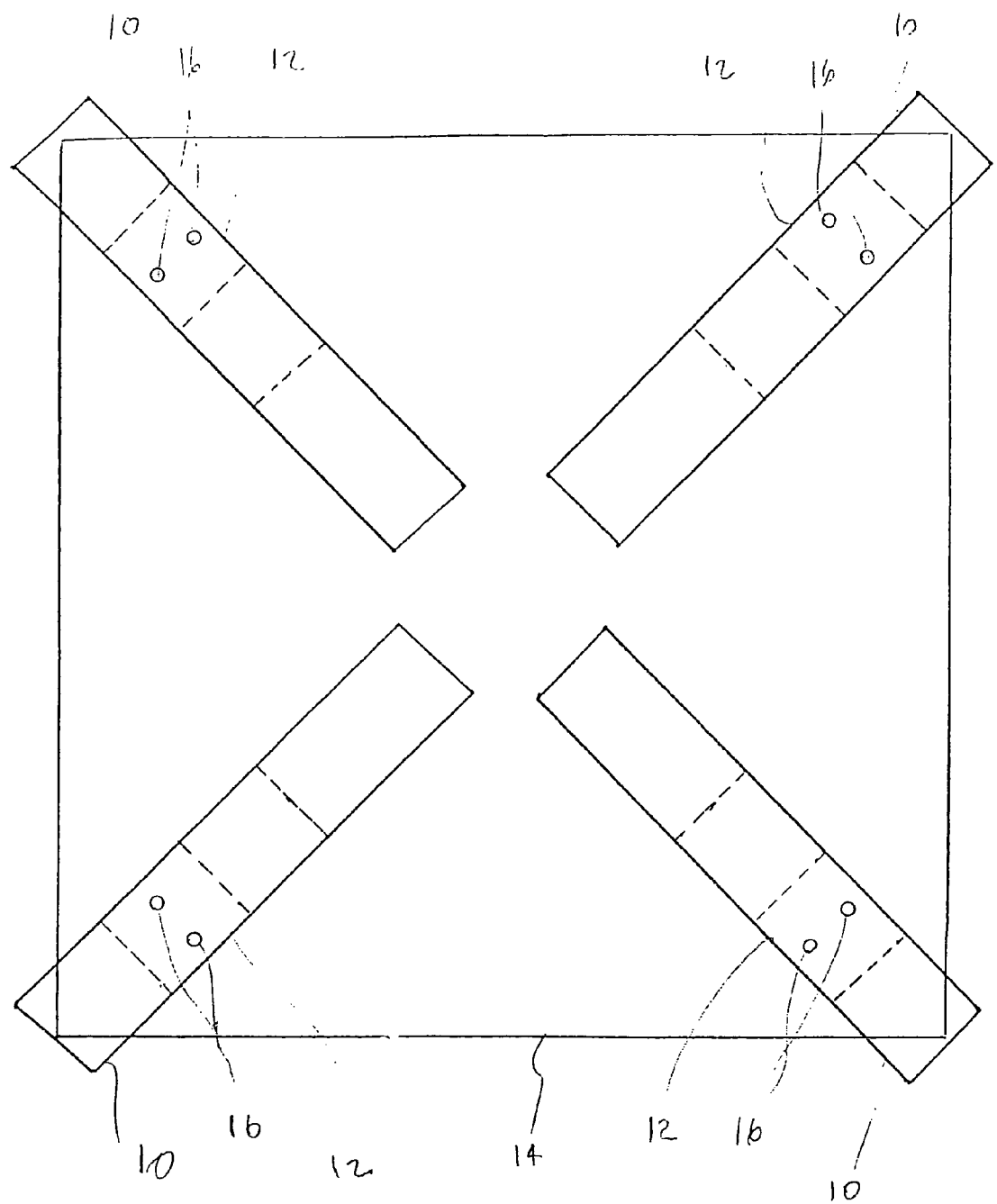
FIG. 3 shows the bottom view of the preferred embodiment.

One embodiment of the Flex-i-Board is illustrated in FIG. 1 (side view), FIG. 2 (top view) and FIG. 3 (bottom view).

The board 14 is constructed of either 6.25 mm (¼ inch) or 12.5 mm (½ inch) thick, approximately 300 mm (12 inch) square, food grade, high density polyethylene and has two 1 mm diameter holes 16 drilled near each of the board's four corners as illustrated in FIG. 2 (top view). The board is white, has a pebbled finish and is in compliance with FDA and USDA requirements and NSF standards 2 and 51.

Figure 4A:
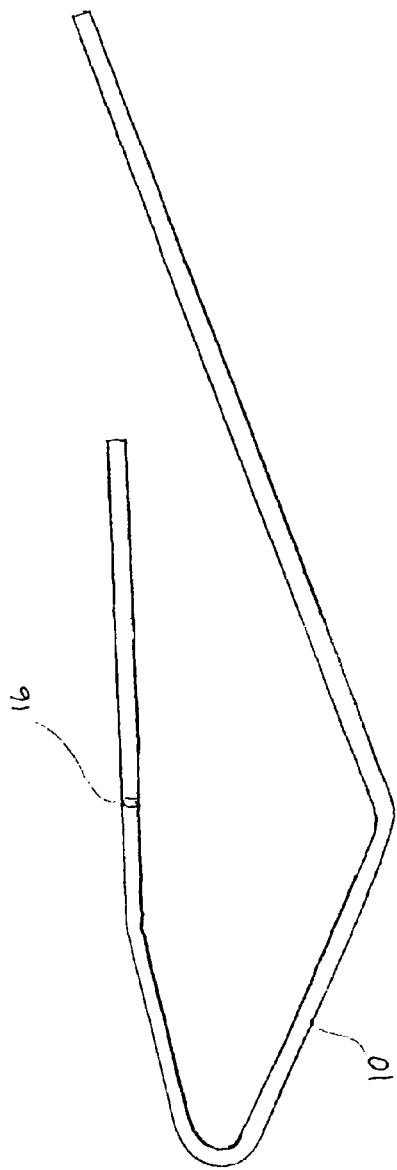
FIGS. 4A to 4C show the side view, top view and bottom view respectively, of a typical leg, of the preferred embodiment.
Figure 4B:
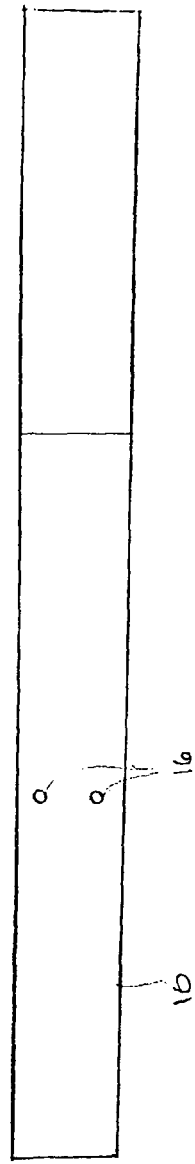
Figure 4C:
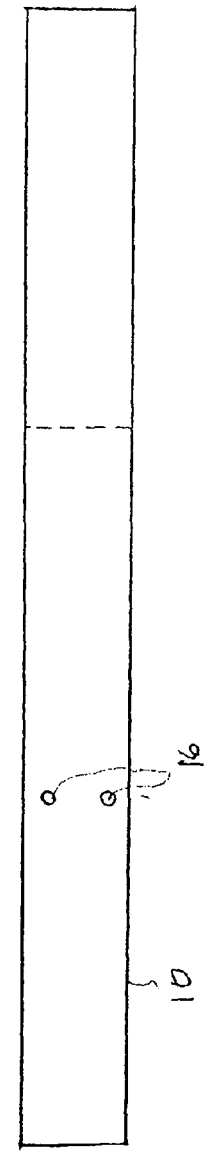

Each of the four, 2.34 mm (³⁄₃₂ inch) thick, 15.6 mm (⅝) wide, approximately 300 mm (12 inch) long polypropylene legs 10, is heat bent into the shape as illustrated in FIG. 4A (side view). Two 1 mm diameter holes 16 are drilled in each of the four legs 10, as illustrated in FIG. 4B (top view), and FIG. 4C (bottom view).

Figure 5A:
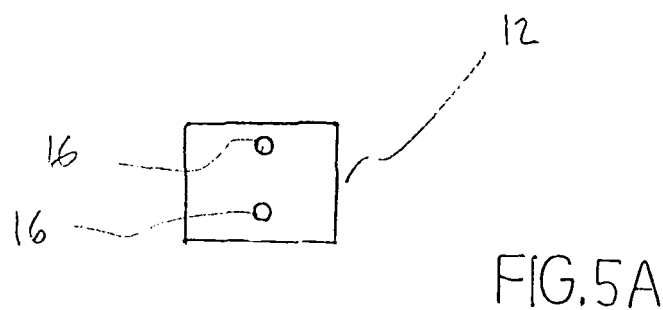
FIGS. 5A and 5B show the top view and a side view respectively, of the compression-resistance extender, of the preferred embodiment.
Figure 5B:

Each of the four, 6.25 mm (¼ inch) thick resistance extenders 12, is cut from a 6.25 mm (¼ inch) thick sheet of high density polyethylene, and is approximately 18.75 mm (¾ inch) by 15.6 mm (⅝ inch) and has two 1 mm diameter holes 16 drilled as illustrated in FIG. 5A.

All of the 1 mm holes 16, in the board, the resistance extenders 12 and the legs 10 are drilled perpendicular to the respective surfaces.

The board 14, resistance extenders 12 and legs 10 are assembled into a unit by inserting a #4-32×¾ inch stainless steel machine screw downward thru each of the eight countersunk holes in the board's top surface, then thru the two holes in each of the resistance extenders, then thru the two holes in each of the legs. The nuts are screwed on the machine screws which extend approximately 1 mm past the leg and are tightened against the leg.

Operation—Diagram 6

When chopping food with a cleaver or softening meat by pounding with a mallet, on a conventional stationary cutting-chopping board, located on a countertop or table, the direct impact of the chopping cleaver or pounding mallet, on the board, results in the transfer of the kinetic energy of the cleaver or mallet to the board as vibrational energy.

This vibrational energy is then transferred as vibrations to the countertop or tabletop, generating a significant amount of noise and shaking items resting on the countertop or tabletop, near the board. The noise generated by the vibrating countertop or table top is significant partly because, of the forced transfer, of vibrational energy from the smaller surface area of the cutting-chopping board to the larger surface area of the countertop or table top.

When chopping or using a mallet, on the Flex-i-Board, an insignificant amount of the kinetic energy of the cleaver or mallet is transferred to the countertop or table top, resulting in an insignificant amount of vibration and consequently an insignificant amount of noise. This is because when the surface of the board 14 is impacted by the cleaver or mallet, the board 14 moves downward, in the direction of the impact, with much of the kinetic energy dissipated, in doing the work, necessary to compress the flexible legs 10 attached to the underside of the board 14.

The impact force, exerted downward, on the surface, of the board 14, depresses the board 14 to the level where the combined upward resistance forces, of the four compressed legs 10, on the bottom, of the board, equals the downward impact force.

The legs 10 go thru three levels of increasing compression-resistance resulting in an incrementally increasing resistance to the impact of the cleaver or mallet, as illustrated in Diagram 6

Figure 6A:
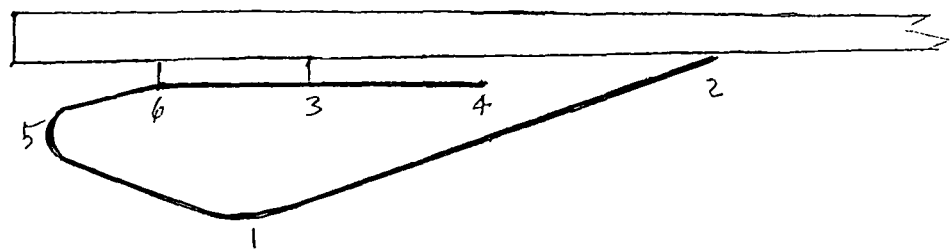

FIG. 6A of Diagram 6, shows the leg at zero compression-resistance.

Figure 6B:
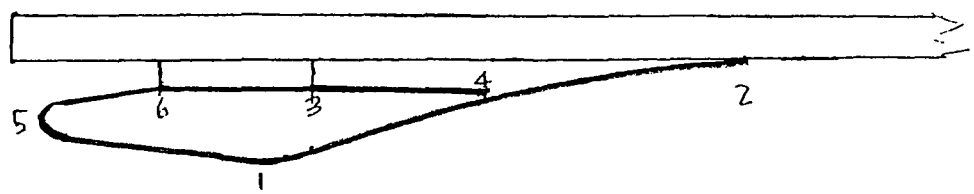

The first level of compression-resistance as illustrated in FIG. 6B of Diagram 6 involves the closing of bend 5, the opening of bend 1 and the flexing of section 1-2. The surface of the board drops about 17.2 mm (¹¹⁄₁₆ inch).

Figure 6C:
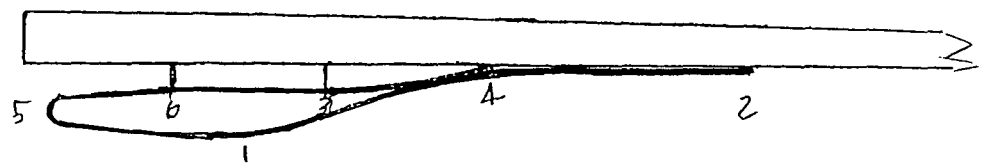

The second level of compression-resistance as illustrated in FIG. 6C of Diagram 6 involves the additional closing of bend 5, the additional opening of bend 1 and the flexing of sect. 3-4 due to the additional flexing of sect. 1-2, which now presses on sect. 3-4. The surface of the board drops about another 9.4 mm (⅜ inch)

Figure 6D:
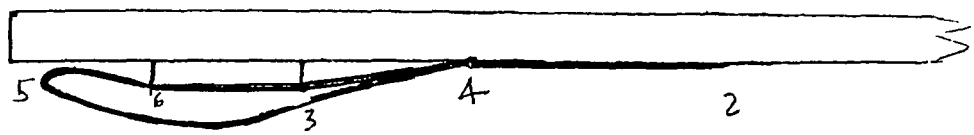

The third level of compression-resistance as illustrated in FIG. 6D of Diagram 6 involves the additional closing of bend 5, the additional opening of bend 1 and the upward flexing of sect. 1-5-6. The surface of the board drops about another 6.3 mm (¼ inch).

The three levels of compression-resistance are cumulative, and therefore can absorb cleaver or mallet impacts ranging from low to high, thus significantly reducing the transmitted vibrations and consequent noise over that range.

The force of a very high impact could exceed the maximum cumulative resistance of the legs and therefore result in the transmittal of some vibration and therefore some noise. In this case, the vibration and consequential noise is still significantly less than if a conventional board was impacted.

FIG. 7

Additional Embodiments

Additional embodiment 1, is shown in FIGS. 7A and 7B. About 300 mm (12 inch) of an approximately 300 mm by 600 mm (12 inch by 24 inch) or larger, piece of polypropylene or other appropriate plastic, is cut into five 125 mm (1.2 inch) strips. Each, of the strips, is alternately, heat bent into a wavy pattern as illustrated in FIG. 7A. The alternating wavy stripes section is heat bent approximately 180 degrees. This section serves as the compressible "legs" 10 for the top section, which serves as the cutting-chopping board surface 14.

Additional embodiment 2, is shown in FIGS. 8A and 8B. A 300 mm (12 inch) by 600 mm (24 inch) or proportionally larger piece of polypropylene or other appropriate plastic is heat bent approximately 190 degrees at both ends with both extension arms (legs 10) pressing against the lower surface of the cutting-chopping board surface as illustrated. Cleaver impact on the surface of the board 14 would be countered by the resistance of compressing each of the circular ends and the upward forces exerted by each of the extension arms (legs 10) on the lower surface of the cutting board.

Additional embodiment 3, illustrated in FIGS. 9A and 9B, would be to initially position two approximately 300 mm (12 inch) by 300 mm (12 inch) or larger, plastic squares over each other then rotate one of them 90 degrees. The two pieces would be secured together with two #4-32×⅜'s countersunk stainless steel machine screws located near each of the four corners, hole 16 location as illustrated in FIG. 9B. Each, of the four corners, of the lower piece, are bent approximately 45 degrees. The 45 degree angle, of the four legs 10, allows for their flexing. The triangular shape of the legs 10 provide for a gradual increase in resistance, as the legs 10 flex, in response to cleaver or mallet impact on the surface of the upper piece 14, where food is supported.

A variation of embodiment 3 is the additional bending of each of the four corners, of the upper piece to approximately 40 degrees. The bent corners of the lower piece provide support on the countertop when the cutting-chopping board is under zero compression. The legs of the upper piece make contact with the countertop when the legs of the lower piece are compressed past a certain point. This provides for additional compression-resistance, from the legs of the upper piece, if the magnitude of the impact is high enough.

Another embodiment would be to use embodiments similar to those illustrated in embodiments 1, 2 and 3, described above, as a cradle, on which a standard plastic or wood cutting-chopping board can be placed. The board could be removable, for cleaning or replacement purposes and held in place, on the embodiments, via mechanical fasteners such as clips or Velcro.

Alternate Embodiments

Many alternate embodiments utilizing compressibility as a means of absorbing the impact of a cleaver or mallet center on designs similar to those illustrated in additional embodiments 1, 2 and 3. A sheet of plastic is bent in such a way, so as to provide a cutting-chopping section with the extended edges bent and shaped so as to provide the compression-resistance needed to absorb cleaver and mallet impacts.

I claim:

1. An apparatus for food preparation said apparatus comprising:
   (a) a top plate member having holes with fastening elements; and
   (b) a bottom plate member having at least four corners being folded which are legs with each said corner being at approximately 45 degrees with said four corners being a plurality of compressible support members allowing for elastically movable angles less than 45 degrees and greater than zero degrees wherein in said bottom plate member is attached through said fastening members.

2. The apparatus according to claim 1, wherein said top plate has a plastic material.

3. The apparatus according to claim 1, wherein said top plate member has a wooden material.

4. The apparatus according to claim 1, wherein said bottom plate member has a plastic material.

* * * * *